United States Patent
Hartmann et al.

[11] Patent Number: 6,082,748
[45] Date of Patent: Jul. 4, 2000

[54] WHEEL SUSPENSION FOR MOTOR VEHICLES

[75] Inventors: Michael Hartmann, Stuttgart; Johann Suess, Korb, both of Germany

[73] Assignee: DaimlerChrysler AG, Stuttgart, Germany

[21] Appl. No.: 09/083,882

[22] Filed: May 26, 1998

[30] Foreign Application Priority Data

May 24, 1997 [DE] Germany .................. 197 21 753

[51] Int. Cl.⁷ .............. B60G 3/00; B60G 3/20; B60G 7/00
[52] U.S. Cl. .............. 280/124.134; 280/124.135; 280/124.179; 267/248
[58] Field of Search .............. 280/124.134, 124.135, 280/124.136, 124.139, 124.141, 124.142, 124.143, 124.179, 124.128, 124.138; 267/248, 254

[56] References Cited

U.S. PATENT DOCUMENTS

| | | |
|---|---|---|
| 1,849,765 | 3/1932 | Masury . |
| 2,128,660 | 8/1938 | Moorhouse ............ 280/124.139 |
| 2,169,336 | 8/1939 | Best ........................ 267/254 |
| 2,202,615 | 5/1940 | Barenyi .................... 267/21 |
| 4,322,088 | 3/1982 | Miyakoshi et al. ......... 280/284 |
| 4,440,413 | 4/1984 | Miyakoshi et al. ......... 280/284 |
| 4,830,396 | 5/1989 | Gandiglio ................. 280/701 |
| 4,881,752 | 11/1989 | Tanaka ..................... 280/690 |
| 5,080,389 | 1/1992 | Kawano et al. ........ 280/124.142 |
| 5,364,114 | 11/1994 | Petersen ................... 267/248 |
| 5,411,285 | 5/1995 | Lee ...................... 280/124.139 |
| 5,704,632 | 1/1998 | Lee ........................ 280/690 |

FOREIGN PATENT DOCUMENTS

| | | |
|---|---|---|
| 42 03 057 | 8/1993 | Germany . |
| 95/12499 | 5/1995 | WIPO . |

OTHER PUBLICATIONS

Patent Abstracts of Japan, Publication No. 61181708, Aug. 14, 1986.

*Primary Examiner*—Peter C. English
*Attorney, Agent, or Firm*—Evenson McKeown Edwards & Lenahan, P.L.L.C.

[57] ABSTRACT

A wheel suspension for motor vehicles, particularly passenger cars, has a wheel control link extending in the transverse direction of the vehicle. On its end away from the wheel, the transverse control link is coupled to each of a spring element and an intermediate link spaced at a distance from each other. The ends of the spring element and the intermediate link away from the transverse link are connected with one another and are jointly supported with respect to the vehicle body via an upright strut.

13 Claims, 4 Drawing Sheets

WHEEL SUSPENSION FOR MOTOR VEHICLES

BACKGROUND AND SUMMARY OF THE INVENTION

This application claims the priority of German patent application No. 197 21 753.2, filed May 24, 1998, the disclosure of which is expressly incorporated by reference herein.

The invention relates to a wheel suspension for motor vehicles.

A wheel suspension is known from German Patent Document DE 4203057 A1. This wheel suspension is a trailing link arrangement or semi-trailing link arrangement in which a spring strut is arranged to be situated almost in parallel horizontally to the link and, on one end, is supported on the link in the area of its end, which is linked to the vehicle body side, on a projection of this link, while the other end of the spring strut is connected with the wheel suspension link by way of an intermediate link which is situated at an acute angle with respect to the spring strut. In the case of this solution, a section of the wheel suspension link therefore forms the rigid base of a support triangle which is formed by the link, the spring strut and the intermediate link and which, in the area of the apex, is supported with respect to the vehicle body by way of an upright strut constructed as a swing support. By means of this arrangement of the spring strut, in which the spring strut is arranged essentially below the wheel suspension link, the spring strut will essentially retain its almost horizontal position during the compression and rebounding of the wheel, specifically while correspondingly changing the length so that acceleration-caused lateral forces onto the spring strut are largely avoided. However, during corresponding suspension movements, the type of linking of the spring strut causes clear deflections of the swing support so that longitudinal forces occur in the vehicle-body-side support of the wheel suspension although the trailing link, the spring strut and the intermediate link form a system which is closed in itself and within which a corresponding support with respect to the forces takes place.

It is an object of the invention to improve a wheel suspension of the type generally described above and to further develop additional applications for that wheel suspension.

These and other objects have been achieved according to the present invention by providing a wheel suspension for a motor vehicle, comprising: a suspension link having a wheel-side end to be connected to a wheel, said suspension link being swivellably disposed on a vehicle body about a swivel axis spaced from said wheel-side end; a spring element swivellably linked to said suspension link at a first linking point which is spaced from said swivel axis and which is spaced from said wheel-side end, said spring element extending from said first linking point generally away from said wheel-side end; an intermediate link swivellably coupled to said spring element at a second linking point which is spaced from said first linking point, said intermediate link being linked to said suspension link at a third linking point which is essentially coaxial with said swivel axis, said spring element and said intermediate link being one above another, said spring element and said intermediate link defining an acute angle; and an essentially upright support supporting said spring element and said intermediate link at said second linking point, said support being coupled to said vehicle body.

These and other objects have also been achieved according to the present invention by providing a suspension link for a wheel suspension for a motor vehicle, comprising: a body section located generally in a plane, said body section including a wheel-side bearing for coupling said suspension link to a wheel, said body section including two body-side bearings for swivellably coupling said suspension link to a vehicle body, said two body-side bearings being spaced from each other and being spaced from said wheel-side bearing, said two body-side bearings being arranged coaxially with each other about a swivel axis, said body section further including an intermediate-link bearing to be coupled to another link of the wheel suspension, said intermediate-link bearing being located between said two body-side bearings and being coaxial with said swivel axis; and an extension arm extending from said body section out of said plane, said extension arm including a bearing for swivellably coupling said suspension link to a spring element.

Since the intermediate link is disposed essentially coaxially with respect to the vehicle-body-side linking of the link on this link, swivel movements of the wheel suspension link remain virtually without any effect on the position of the strut constructed as a swing support and therefore no deformation of the link bearings will occur as the result of the suspension. Furthermore, in the case of the solution according to the invention, the spring element, such as a spring strut, will essentially retain its position so that no acceleration-caused lateral forces will occur. The type of the arrangement of the spring element and the intermediate link also permits a very flat construction which, in particular, is also suitable for transverse link arrangements, in which case the two correspondingly constructed wheel suspensions assigned to an axle of the vehicle, when they are dimensioned correspondingly, will require only one joint strut for the support with respect to the vehicle body. However, the invention also provides multiple possibilities for changing the transmission ratio in that, relative to a vertical plane extending through the vehicle-body-side linking of the wheel suspension link parallel to the driving direction, the linking point of the spring system which is located above on the wheel suspension link is offset to one side or the other, optionally in connection with the fact that, relative to the height of the vehicle-body-side linking point of the wheel suspension link, the height of the linking point of the strut formed by the intermediate link and the strut and therefore also the length of the spring element and/or of the intermediate link are changed correspondingly. As an adaptation to the respective height of the linking point between the spring element and the intermediate link determined in its height by way of the strut, the strut can also be arranged to be pointing upward or downward.

Other objects, advantages and novel features of the present invention will become apparent from the following detailed description of the invention when considered in conjunction with the accompanying drawings.

DETAILED DESCRIPTION OF THE DRAWINGS

Figure 1:
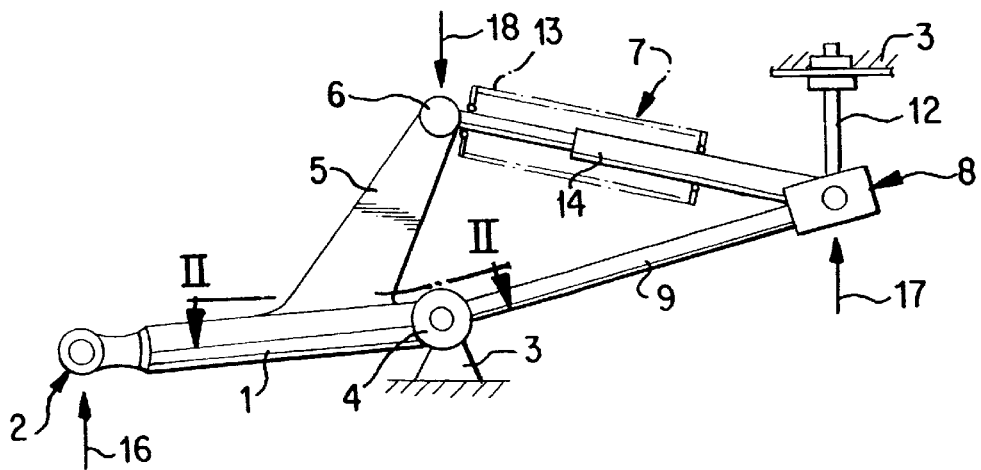
FIG. 1 is a schematic lateral view of a wheel suspension according to a preferred embodiment of the present invention.

In the schematic representation of a wheel suspension for vehicles, particularly passenger cars, according to the invention illustrated in FIG. 1, reference number 1 indicates a wheel suspension link in the form of a transverse link which is situated transversely to the driving direction of the vehicle not shown here and whose wheel-side end 2, in a manner not shown in detail, for example, by way of a wheel carrier, which is not shown here and which is supported with respect to the vehicle body by an upper suspension link, carries a wheel which is also not shown. The wheel plane is situated perpendicularly to the plane of projection.

Opposite the wheel-side end 2, the link 1 is linked to the vehicle body side, in which case the vehicle body is only schematically outlined in all representations and has the reference number 3. The linking to the vehicle body takes place in a conventional-manner by way of elastic link bearings 4 whose shape is not shown in detail and which are constructed in a conventional manner and, with a view to the respective load conditions, may also have a correspondingly hard construction along their circumference.

In the embodiment, the link 1 is provided with an upward-projecting extension arm 5 which forms a rigid link component and which forms on its free end the link-side linking of a spring element 7 of the spring system of the wheel suspension. At the end away from the linking 6 (first linking point), the spring element 7 is connected at point 8 with an intermediate link 9 which, in turn, is linked to the transverse link 1, this linking taking place preferably coaxially but at least almost coaxially with respect to the vehicle-body-side linking (link bearing 4) of the link 1. This linkage is not visible in FIG. 1 but in the sectional view according to FIG. 2, which corresponds to the sectional view II—II in FIG. 1. The linking of the intermediate link 9 to the link 1 has the reference number 10 (third linking point) in FIG. 2 and is preferably formed by an elastic, particularly elastically hard bearing. Since the bearing forming the linkage 10 and the link bearings 4 are situated coaxially and since the swivel axis 11 assigned to these bearings is fixed to the vehicle body, swivel movements of the link 1, such as suspension-caused swivel movements of the link 1, despite the connection to the intermediate link 9, result in no changes in the position of the vehicle-body-side linkage 10 of the intermediate link 9 so that a swing support which is formed by the strut 12 (essentially upright support) and which is provided in the connection point 8 (second linking point) of the spring element 7 and the intermediate link 9 as the supporting with respect to the vehicle body 3, retains its position, which in the embodiment is upright and preferably vertical, in an unchanged manner. The linking of the strut 12 to the vehicle body 3 is illustrated only schematically and is constructed preferably elastically, as is customary in the case of swing supports.

The spring element 7 is also outlined only schematically in the embodiment and consists of a spring-and-damper unit whose spring has the reference number 13 and whose damper has the reference number 14. In the embodiments of FIGS. 1–9, the spring 13 of the spring element 7 is situated above the intermediate link 9 and is loaded by pressure.

Figure 9:
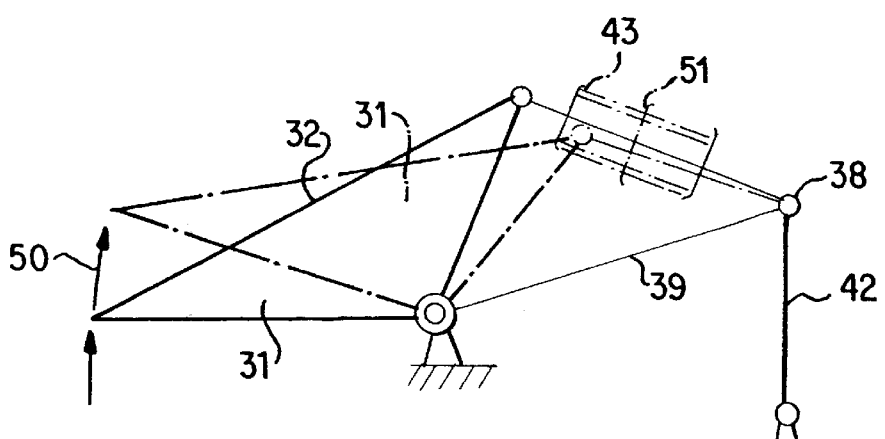
Figure 10:
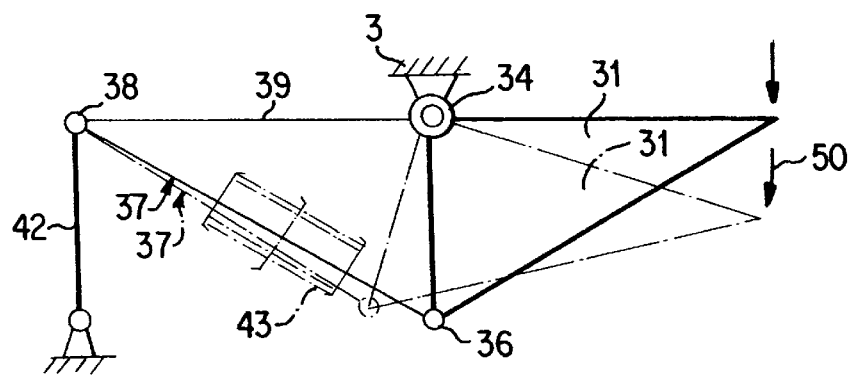
FIG. 10 is a schematic view of a wheel suspension in which the spring element is situated below the intermediate link.

However, the spring element may also be situated below the intermediate link with the extension arm extending downward, for example as shown in FIG. 10, in which case the spring element is loaded by pressure also in this embodiment and the spring is formed by a pressure spring. While FIG. 10 corresponds to FIG. 6 turned upside down, the spring element may be situated below the intermediate link in any of the other embodiments shown in FIGS. 1–9 in a similar manner.

In the embodiment of FIG. 1, the damper is linked with its piston-rod-side end to the extension arm 5. However, this linkage can also take place in a reversed manner, as illustrated by FIGS. 4 and 5 (i.e., with the piston-rod-side end linked at point 8.).

Figure 2:
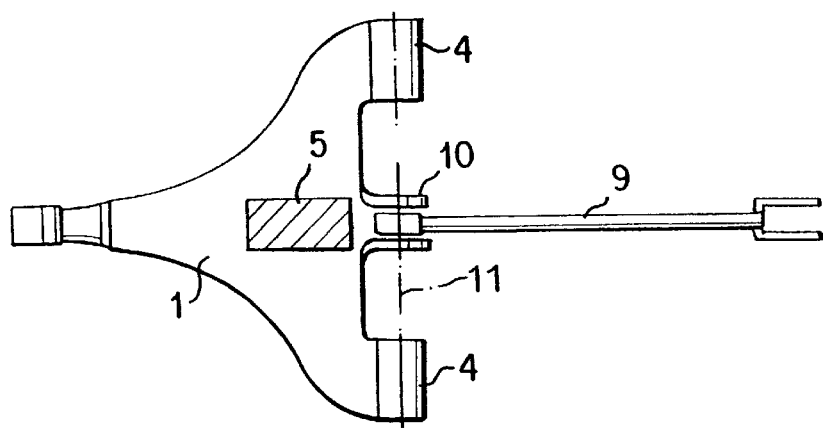
FIG. 2 is a sectional view along Line II—II of FIG. 1.
Figure 3:
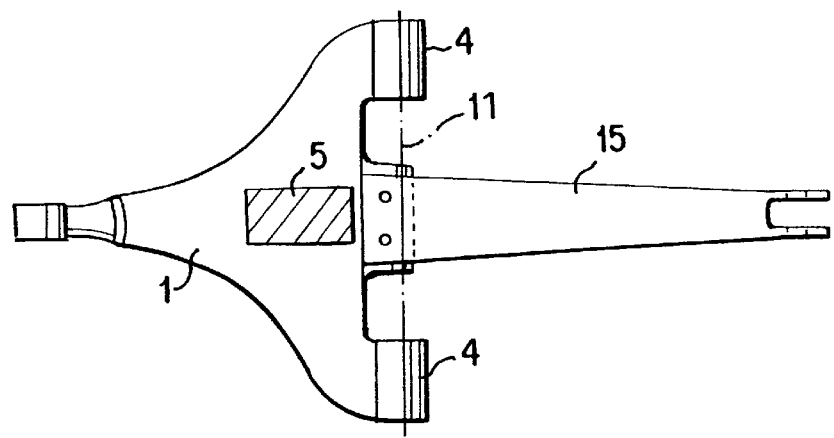
FIG. 3 is a sectional view as in FIG. 2 of another preferred embodiment of the wheel suspension according to the invention.
Figure 4:
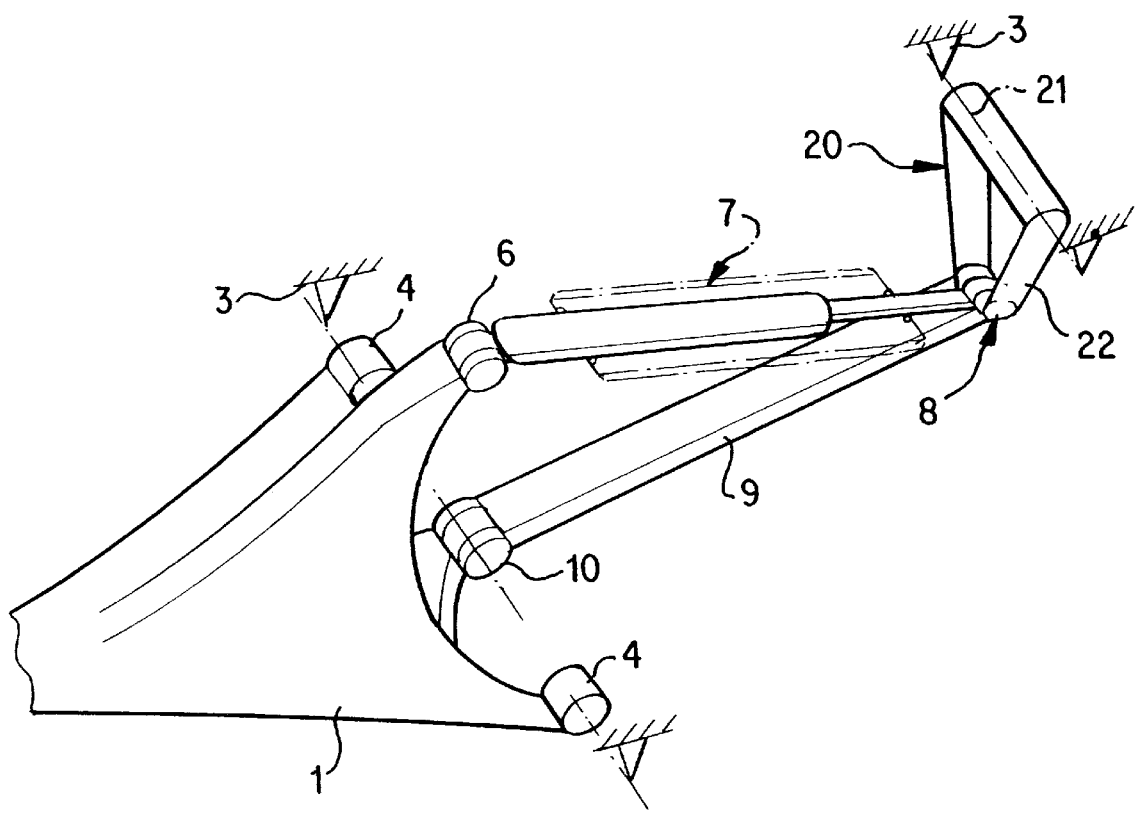
FIG. 4 is a perspective view of the wheel suspension illustrated in FIG. 1.
Figure 5:
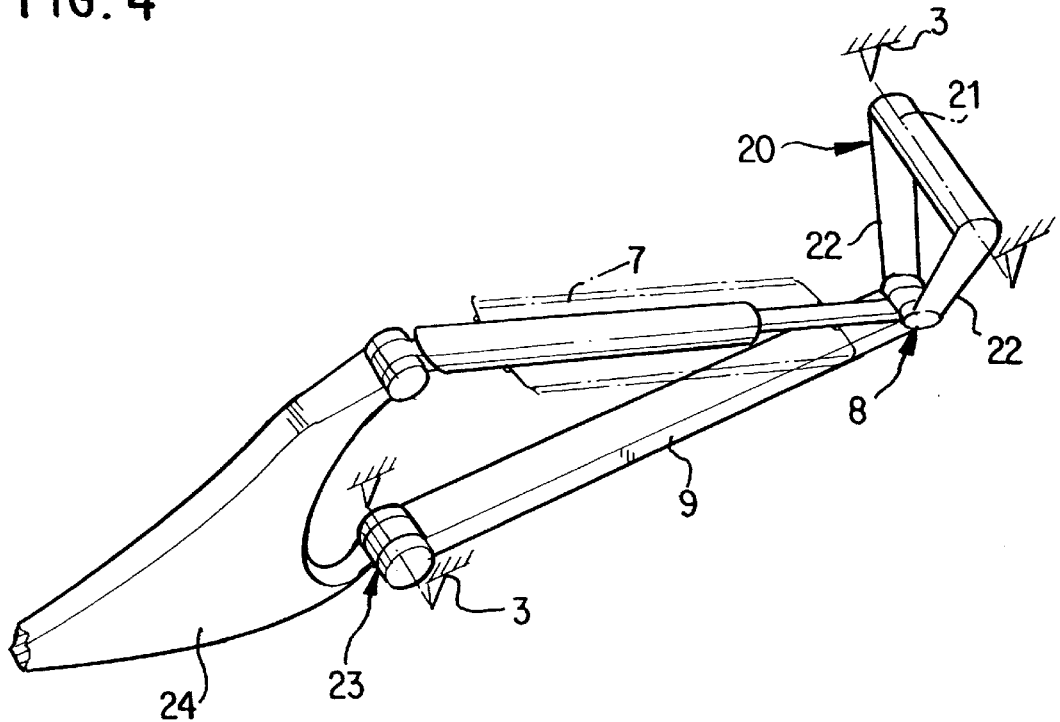
FIG. 5 is a perspective view as in FIG. 4 of another preferred embodiment of a wheel suspension according to the invention.

FIGS. 2 to 4 show embodiments in which the link 1, as the transverse link, has two vehicle-body-side bearings 4 and the intermediate link 9 is swivellably supported on the link 1 approximately in the center between these vehicle-body-side bearings by way of the linkage 10.

The embodiment according to FIG. 3 shows the special characteristic that the intermediate link is constructed as a leaf spring 15 which is mounted on the link 1 such that the bending axis of the spring falls essentially into the swivel axis 11 of the link 1 so that, also in this embodiment, suspension-caused swivel movements which result from changes in the height of the wheel, which is not shown, have no effect on the constructively fixed, upright course of the swing support 12 which is vertical in the embodiment. This is so, irrespective of the fact that, as illustrated in FIG. 1, supporting forces 16, 17 are introduced into the system on the wheel side and on the vehicle-body-side (strut 12) to which a counterforce 18 corresponds in the vertical plane containing the link bearings 4, which counterforce 18 results from the weight of the vehicle, and that by way of the spring element 7 with the pressure spring 13, these forces must be maintained in an equilibrium. However, the forces which are operative in the axis of the spring element 7 are absorbed as internal forces with respect to their horizontal component by way of the intermediate link 9 which, like the spring element 7, is supported with respect to the link 1 which, together with its extension arm 5, forms the base of the support triangle comprising the intermediate link 9 and the spring element 7.

Since, in the case of the described construction, the linking point 8 between the spring element 7 and the intermediate link 9 virtually maintains its position in the space, and therefore also the strut 12, the vertical forces 16 to 18 affecting the wheel suspension relative to the vehicle-body-side linkages, formed by the link bearings 4 and the connection 8 between the strut 12, the spring element 7 and the intermediate link 9 are absorbed without transverse force since such transverse forces would occur only if the strut 12, as the swing support, would experience a deflection from its vertical construction position.

The swing support (strut 12) is shown only schematically in FIG. 1 and, according to a further development, can also be formed by a rocker 20 which has a swivel axis 21 extending in the driving direction because swinging movements occurring in the longitudinal direction of the vehicle play virtually no role and, as the result of a certain elasticity in the linking of the rocker 20 with respect to the swivel axis 21, a sufficient mobility can be ensured also in this regard. The rocker 20 has arms 22 between which the intermediate link 9 and the spring element 7 which can be disposed in a conventional manner.

Deviating from the above-described support of the wheel suspension link 1 constructed as a transverse link by way of two link bearings 4 spaced with respect to one another in the longitudinal direction of the vehicle, a further development according to FIG. 5 may also be selected in the case of which only a vehicle-body-side link bearing 23 is provided for a suspension link 24 constructed as the wheel suspension link in the form of a transverse link if the remaining wheel suspension, which is not shown here, lets such a further development seem expedient.

FIGS. 6 to 9 show further schematic developments of the wheel suspension according to the invention, in which case the illustrated embodiments show that, as the result of the position of the linking points between the spring element and the wheel suspension link, on the one hand, and between the spring element and the intermediate link, on the other hand, not only an adaptation to constructive vehicle conditions, which may be desired in the individual cases, can be achieved but the length of the spring element and in connection therewith the length of the possible spring paths can also be influenced. In particular, it is also illustrated that the strut acting as the swing support can be arranged to be pointing upward as well as downward. Further development possibilities are not shown in which the spring element takes up a position relative to the intermediate link in which the intermediate link is situated above the spring element, thus mirror-invertedly to the representations according to FIGS. 6 to 9, since to this extent, the functional conditions are basically the same.

Figure 6:
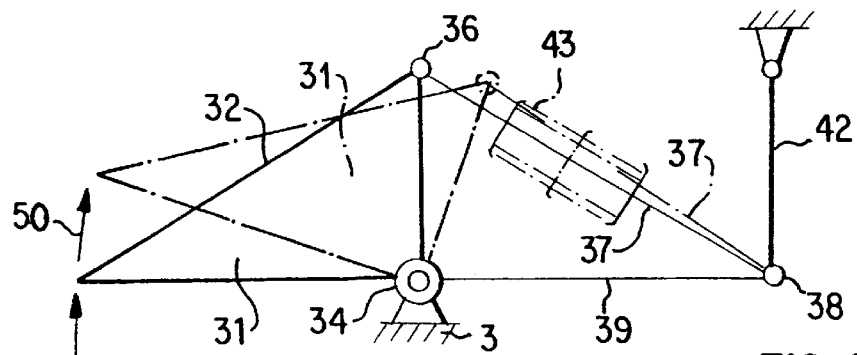
FIGS. 6 to 9 are schematic views of wheel suspensions according to preferred embodiments of the present invention in various geometrical designs.
Figure 7:
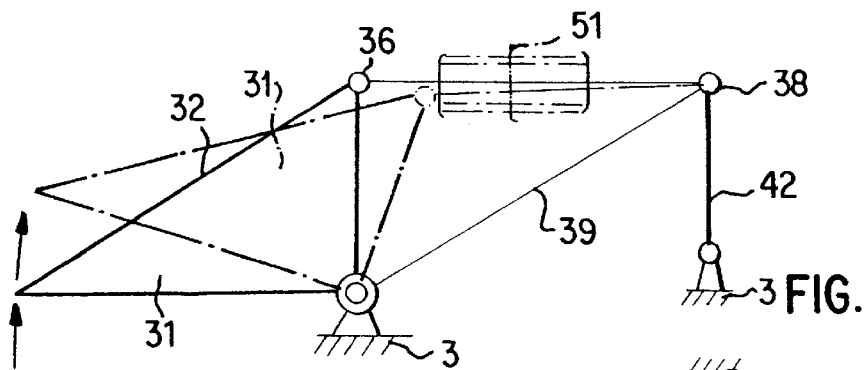

In the illustrations according to FIGS. 6 to 9, the wheel suspension link always has the reference number 31 and is symbolically illustrated by a triangle which, in the initial position, is drawn by thick solid lines. In FIGS. 6 and 7, the sides of this triangle meeting at linking point 34 form a right angle; in FIG. 8, the sides of the triangle meeting at linking point 34 form an acute angle while the base 32 is shortened; and in FIG. 9, the sides of the triangle meeting at linking point 34 form an obtuse angle while the base 32 is lengthened.

Corresponding to the same initial situation, specifically, a respective right triangle in FIGS. 6 and 7, the link-side linking points 34, 36 of the intermediate link 39 and of the spring element 37 are situated in a vertical plane containing the link bearings, the vertical plane extending in the longitudinal direction of the vehicle and the axes of rotation of the linking points extending essentially in the longitudinal direction of the vehicle.

If now, as illustrated in FIGS. 6 and 7, the linking point 38 between the spring element 37 and the intermediate link 39 as well as of the vertically arranged strut 42 is placed in a horizontal plane which extends through the vehicle-body-side linking points of the wheel suspension link 31, thus the link bearings 34 (FIG. 6) or through the link-side linking point 36 (first linking point) of the spring element (FIG. 7), the base of the triangle formed by the spring element 37 and the intermediate link 39 is formed, on the one hand, by the spring element 37 (FIG. 6) or, in the case of FIG. 7, by the intermediate link 39. This results in correspondingly different initial lengths of the spring element, and relative to the same initial lengths of the spring 43, in different transmission ratios relative to the same swivel paths 50 of the wheel suspension link 31. In the case of a larger initial length of the spring 43 (FIG. 6), this ratio is smaller than in the case of a smaller initial length of the spring (FIG. 7). The spring length, which in each case corresponds to the compression, is symbolized by the spring plate 51 illustrated by a broken line.

Figure 8:
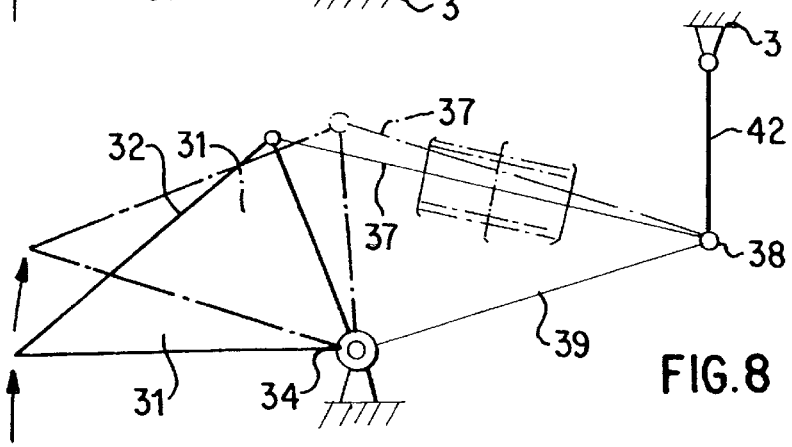

Other possibilities of influencing the initial constructive length of the spring element by a corresponding lengthening or shortening of the distance between the link-side linking point 36 of the spring element and the strut-side linking point 38 (second linking point) of the spring element are illustrated in FIGS. 8 and 9. In FIG. 8, the possible initial length of the spring element 37 is enlarged; in FIG. 9, it is shortened by the corresponding lateral displacement of the link-side linking point 36 of the spring element 37.

Naturally, it is also possible to combine the measures illustrated by FIGS. 6 and 7, 8 and 9 and, as a result, further increase the mentioned effects. In particular, the described construction measures also offer possibilities for varying the supporting length between vehicle-body-side link bearings 34 and the linking of the wheel suspension link 31 and of the spring element 37 and, as a superimposition on the described construction measures, nevertheless vary the respective desired spring design within a relatively wide scope.

Figure 11:
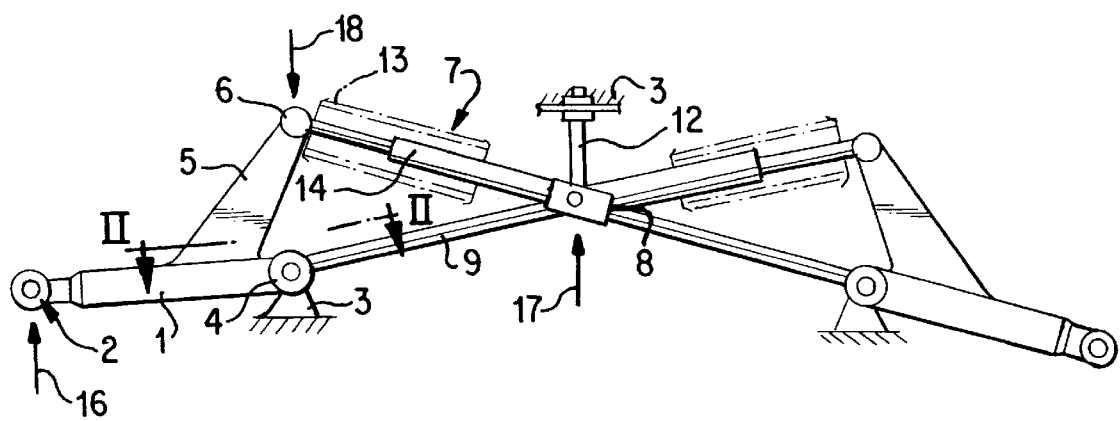
FIG. 11 is a schematic lateral view of a wheel suspension for both wheels of a common axle according to a preferred embodiment of the present invention.

As a further development of the invention shown in FIG. 11, the two wheel suspensions assigned to an axle of a vehicle can be designed according to the invention, in which case it will then be advantageously possible to support their mutually facing ends, which are supported by way of the strut with respect to the vehicle body, by a common strut so that only one common central support point is obtained. This is possible in the case of the solution of the invention because the strut retains its position in the space during suspension movements of the wheel. This results in a further simplification.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel suspension for a motor vehicle, comprising:
a suspension link having a wheel-side end to be connected to a wheel, said suspension link being swivellably disposed on a vehicle body about a swivel axis spaced from said wheel-side end;
a spring element swivellably linked to said suspension link at a first linking point which is spaced from said swivel axis and which is spaced from said wheel-side end, said spring element extending from said first linking point generally away from said wheel-side end;
an intermediate link swivellably coupled to said spring element at a second linking point which is spaced from said first linking point, said intermediate link being linked to said suspension link at a third linking point which is essentially coaxial with said swivel axis, said spring element and said intermediate link being one above another, said spring element and said intermediate link defining an acute angle; and
an essentially upright support supporting said spring element and said intermediate link at said second linking point, said support being coupled to said vehicle body.

2. A wheel suspension according to claim 1, wherein the third linking point is disposed coaxially with said swivel axis.

3. A wheel suspension according to claim 1, wherein said first linking point is situated above said swivel axis.

4. A wheel suspension according to claim 1, wherein said first linking point is situated below said swivel axis.

5. A wheel suspension according to claim 1, wherein said suspension link is swivellably disposed on the vehicle body via two bearings which are spaced from each other along said swivel axis, which extends in a longitudinal direction of the vehicle, the third linking point being located between said bearings.

6. A wheel suspension according to claim 1, wherein said first linking point is located in an upright plane extending through said swivel axis.

7. A wheel suspension according to claim 1, wherein said first linking point is laterally offset from an upright plane extending through said swivel axis.

8. A wheel suspension according to claim 1, wherein said intermediate link is arrange d approximately horizontally.

9. A wheel suspension according to claim 1, wherein the spring element is arranged approximately horizontally.

10. A wheel suspension according to claim 1, wherein said second linking point is located between a horizontal plane containing said swivel axis and a horizontal plane containing said first linking point.

11. A wheel suspension according to claim 1, wherein said suspension link extends in a transverse direction of the vehicle.

12. A wheel suspension system for two wheels located at opposite ends of an axle of a motor vehicle, comprising a pair of wheel suspensions, each suspension comprising the suspension of claim 1, the suspensions arranged mirror-symmetrically with respect to a longitudinal center plane of the vehicle such that said suspension link of each of said wheel suspensions extends in a transverse direction of the vehicle, said spring elements and said intermediate links of both of said pair of said wheel suspensions being supported by a common single essentially upright support.

13. A suspension link for a wheel suspension for a motor vehicle, comprising:

a body section located generally in a plane, said body section including a wheel-side bearing for coupling said suspension link to a wheel, said body section including two body-side bearings for swivellably coupling said suspension link to a vehicle body, said two body-side bearings being spaced from each other and being spaced from said wheel-side bearing, said two body-side bearings being arranged coaxially with each other about a swivel axis, said body section further including an intermediate-link bearing to be coupled to another link of the wheel suspension, said intermediate-link bearing being located between said two body-side bearings and being coaxial with said swivel axis; and an extension arm extending from said body section out of said plane, said extension arm including a bearing for swivellably coupling said suspension link to a spring element.

* * * * *